United States Patent [19]

Boario

[11] 4,117,480

[45] Sep. 26, 1978

[54] REAL TIME SIGNAL CORRELATOR FOR HIGH RESOLUTION RADAR

[75] Inventor: William R. Boario, Dayton, Ohio

[73] Assignee: The United States of America as represented by the Secretary of the Air Force, Washington, D.C.

[21] Appl. No.: 425,095

[22] Filed: Jan. 12, 1965

[51] Int. Cl.² .............................................. G01S 9/02
[52] U.S. Cl. ............................. 343/5 CM; 324/77 K; 343/5 SA; 343/100 CL
[58] Field of Search .............. 343/5 PR, 100.7, 5 CM, 343/5 SA, 100 CL; 324/77 K

[56] References Cited

U.S. PATENT DOCUMENTS 3,184,679  5/1965  Kuehne ............................. 343/100.7

Primary Examiner—S. C. Buczinski
Attorney, Agent, or Firm—Joseph E. Rusz; Louis E. Hay

EXEMPLARY CLAIM

1. A real time signal correlator for use on high resolution mapping radar apparatus aboard a moving aircraft having a ground speed indicator and comprising on an optical axis in the order named: A time modulating light source, a first cylindrical lens, an optical filter having at least one optically apertured time variable function and located to be substantially at the imaging plane of said first cylindrical lens, a second cylindrical lens optically parallel to said first cylindrical lens, and an optically sensitive film substantially at the imaging plane of said second cylindrical lens normal to the optical path and movable in a direction parallel to the time variable function on said optical filter, the linear velocity of said film being synchronized to the ground speed indicator on the aircraft so that when the time function of said modulating light source is identical with the time variable function of said optical filter the two time variable functions are correlated and impressed upon said film.

2 Claims, 5 Drawing Figures

U.S. Patent  Sept. 26, 1978  4,117,480
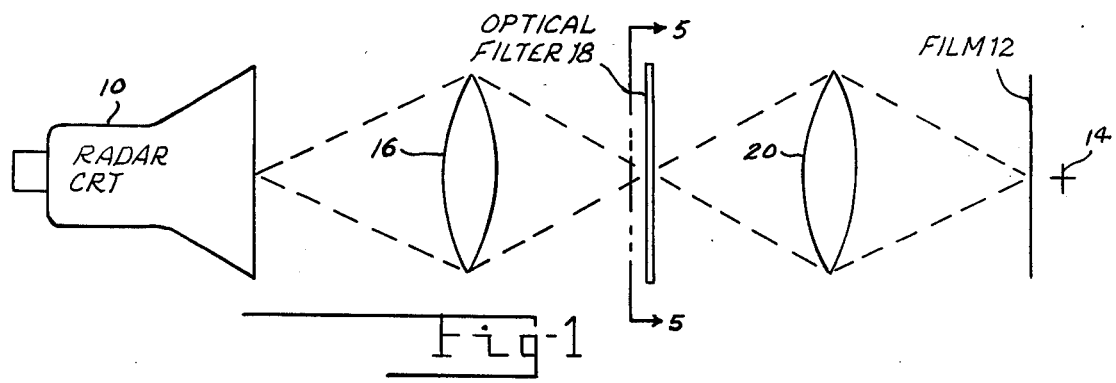
Fig-1
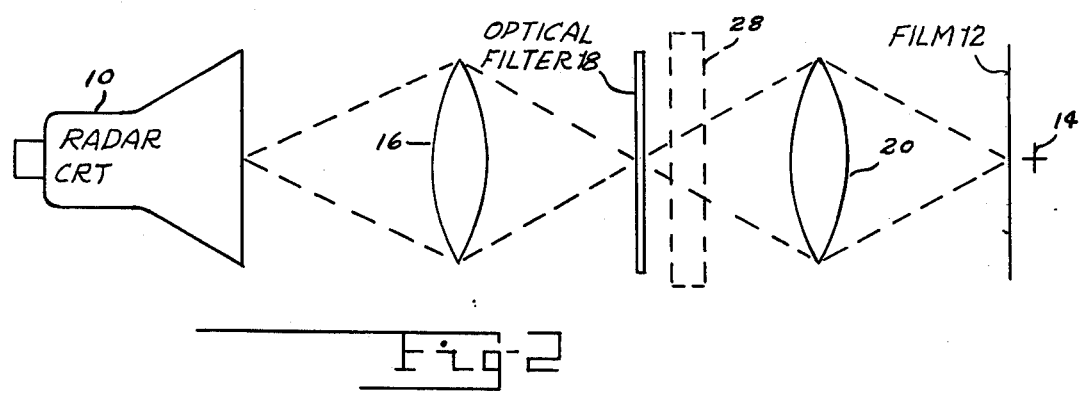
Fig-2
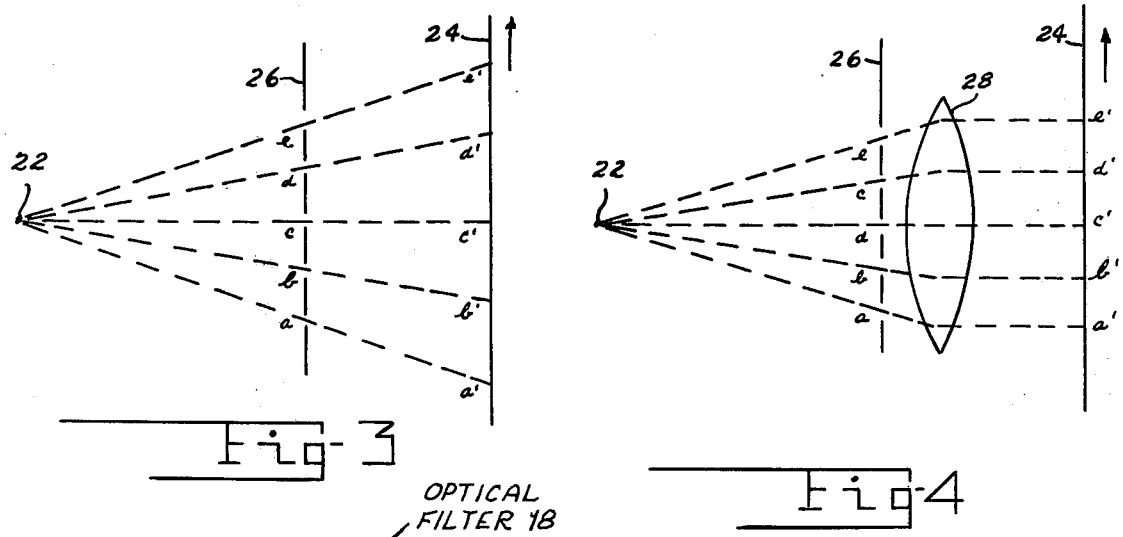
Fig-3
Fig-4
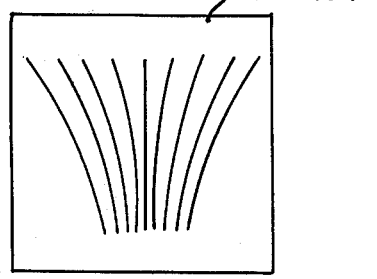
Fig-5
INVENTOR
WILLIAM R. BOARIO
BY Harry A. Herbert Jr and
Louis E. Hay
ATTORNEYS

REAL TIME SIGNAL CORRELATOR FOR HIGH RESOLUTION RADAR

This invention relates to signal correlators, and more specifically to correlators using a modulating light source as the signal input. Although the modulating light source may be keyed to any signal input such as noise signals or temperatures, its present primary use, as will be disclosed, is with high resolution radar apparatus. Therefore, while not limited to such use and for purposes of illustration, the present invention will be disclosed as applied to high resolution radar apparatus carried aboard aircraft having a ground speed indicator and used for ground mapping.

High resolution radars, such as those used for ground mapping, require processing of the signal output from the radar receiver. The basic radar is capable of supplying a signal output representative of the signal characteristics at the antenna. This signal output usually consists of the parameters of signal amplitude and phase. In a pulsed radar, the range component of the output signals are separated in time because of signal propagation time. By taking sequential signal samples of a given range increment, the function of the signal can be correlated with reference data to create the effect of a large synthetic antenna array and thereby improve resolution. These include the use of recirculating acoustic delay lines, low pass resistor-capacitors, resistor-capacitor-inductance filters, and techniques based on optical principles. Most of the above named techniques are either bandwidth limited and inadequate, or require excessive time to accomplish processing and display.

The correlator to be described, when used with a modulating light as the working medium, has an advantage over present optical correlators used for high resolution radars. This correlator permits the direct or real time insertion of the radar information. Present optical correlators require storage of the signal before correlation, thus requiring time for the accomplishment of this function.

A primary object of this invention is to provide an optical correlator in which a modulating signal may be inserted and processed in real time.

Another object of this invention is to provide an optical correlator in which a modulating signal may be inserted and processed in real time and is capable of being correlated against complex functions.

A further object of this invention is to provide an optical correlator in which a modulating signal may be inserted and processed in real time and is capable of correlating many complex functions simultaneously.

Yet another object of this invention is to provide an optical correlator in which a modulating signal may be inserted and processed in real time, and when correlating many complex functions, may have controllable output scale factors.

Additional objects, advantages and features of the invention reside in the construction, arrangement and combination of parts involved in the embodiments of the invention as will appear from the following description and accompanying drawings, wherein FIG. 1 is a schematic view of one embodiment of the invention, FIG. 2 is a schematic view of a second embodiment of the invention, FIG. 3 is a schematic illustrating the operation of the embodiment shown on FIG. 1, FIG. 4 is a schematic illustrating the modification effected by the embodiment shown on FIG. 2, and FIG. 5 is a schematic view of a typical filter along line 5—5 on FIG. 1 and apertured to a Doppler shift.

Referring to FIG. 1, which depicts the first embodiment of the invention, the modulating light source is shown as the cathode ray tube 10 of a typical radar apparatus. At the opposite end of the device constituting this invention, a strip film 12 is indicated to be moving into the plane of the paper as symbolically indicated by the tail of an arrow 14. The elements on the optical path between the cathode ray tube 10 and the strip film 12 comprise, in the order named, a first cylindrical lens 16, an optical filter 18, and a second cylindrical lens 20. The cathode ray tube and the optical elements are mechanically arranged to place the optical axis normal to the strip film. The cylindrical lenses 16 and 20 are conventional lenses having a longitudinal axis normal to the optical axis. The optical filter may be any conventional and well known filter which is apertured in accordance with correlation data. The filter illustrated on FIG. 5 is apertured to a Doppler shift; the abscissas indicating time and the ordinate indicating radar range.

The principle of operation is symbolically illustrated by FIG. 3. Point 22 represents a point light source which may be modulated in amplitude and phase, and is representative of a signal such as is generated by a radar apparatus. A correlation detector and integrator 24 may consist of any material or device which is sensitive to the signal emitted by point 22. In the present example, since point 22 emits light, the correlation detector and integrator 24 may be any light sensitive material such as photographic film or photo sensitive tape. Filter 26 is a reference mask which represents the function to which the signal from point 22 is to be correlated.

When light, which is representative of the radar signal, is emitted by point 22, light rays pass through apertures or transparent areas $a$, $b$, $c$, $d$, and $e$ of filter 26 and strike the correlation detector and integrator 24, which is a film strip moving in the direction indicated by the arrow. The spacing and transmissivity of the apertures in the filter depend upon the function to be correlated and thereby represent the function. The rays of light passing through the apertures in the filter are recorded on the film strip. As time elapses, the signal from point 22 modulates while the film is constantly moving in the direction of the arrow. If the geometry represented by 22, 26, and 24 is properly selected, after a given elapsed time when another signal is emitted, and with the reference filter 26 representing the elapsed time function, the rays penetrating the apertures will be integrated or summed on the film. For example: if the signal from point 22 is a periodic function and the filter 26 represents this function, and the photographic film has moved so that the position at $a^1$ is now at $b^1$, and the position at $b^1$ is now at $c^1$ etc., the recorded function recorded on the film would be the correlated function. The functions to be correlated need not be linear. Non-linear complex functions may be correlated, including several signals having time separation.

In the arrangement of elements depicted by FIG. 1, the point light source 22 is replaced by the cathode ray tube 10 having an intensity modulated line source of illumination. Here each range element is represented by a point on the line as in conventional radar display traces. The basic operation is identical with that previously described in connection with FIG. 3, but in order to obtain optimum correlation for each range element presented on the cathode ray tube, the optical filter 18 may have a function which varies in the vertical dimension as shown on FIG. 5. Optimum correlation for each range element would then be recorded in the vertical dimension on the film strip normal to the direction of film travel, while the lateral dimension would represent azimuth. The above discussion assumes the use of only elements 10, 12, and 18 as shown on FIG. 1.

The above configuration (elements 10, 12, and 18) however suffers from contamination of range element information since light from all range elements on the trace displayed on the cathode ray tube will impinge on all parts of the optical filter 18 and even residual light of non-correlated signals will be recorded on undesirable areas of the strip film. The problem is eliminated by the use of light baffles in the optical path to restrict the light to the proper paths. The light baffles may be the cylindrical lenses 16 and 20 as shown, or they may be optical pipes, or more conventional lenses. In the embodiment shown on FIG. 1, each range element is correlated with the proper range correlation function on the filter 18 and is so recorded. The trace on the cathode ray tube 10 is imaged by cylindrical lens 16 onto the correlation optical filter 18. The transmitted light from filter 18 is imaged on the photographic film 12 through cylindrical lens 20. Cylindrical lenses are required at 16 and 18 so that the imaging is accomplished only in the range dimension; thereby not affecting the correlation process in azimuth. As was previously pointed out when explaining the basic principle in connection with FIG. 3, the film speed must be correct in order to secure recorded correlation. Proper film speed is secured by synchronizing the film speed to the ground speed indicator on the airplane.

A second embodiment of the invention is shown on FIG. 2. The second embodiment uses all the elements of the embodiment shown on FIG. 1, plus the addition of a third cylindrical lens 28 which is orthogonally oriented on the optical axis and longitudinally located between the optical filter 18 and the second cylindrical lens 20. The lens 28 is shown by dotted lines on FIG. 2 in order to indicate that it has no influence in the plane of the optical path shown; the influence being in the plane normal to lenses 16 and 18. The second embodiment is desirable where it is necessary to compress the correlated output into a shorter footage on the film strip.

The influence of cylindrical lens 28 is shown on FIG. 4 which is identical with FIG. 3 except for the addition of lens 28; like elements having like numerals. It is noted that lens 28 parallels the light rays emitting from the point light source 22 and that the film distance $a^1$-$e^1$ is therefore less on FIG. 4 than on FIG. 3. If desired, lens 28 may be designed to diverge the emitted rays less than illustrated, in which case the film distance $a^1$-$e^1$ is greater than illustrated; or, the divergence may be even greater, in which case the film distance $a^1$-$e^1$ is less than illustrated.

It is to be understood that the embodiments of the present invention as shown and described are to be regarded as illustrative only and that the invention is susceptible to variations, modifications and changes within the scope of the appended claims.

I claim:

1. A real time signal correlator for use on high resolution mapping radar apparatus aboard a moving aircraft having a ground speed indicator and comprising on an optical axis in the order named: A time modulating light source, a first cylindrical lens, an optical filter having at least one optically apertured time variable function and located to be substantially at the imaging plane of said first cylindrical lens, a second cylindrical lens optically parallel to said first cylindrical lens, and an optically sensitive film substantially at the imaging plane of said second cylindrical lens normal to the optical path and movable in a direction parallel to the time variable function on said optical filter, the linear velocity of said film being synchronized to the ground speed indicator on the aircraft so that when the time function of said modulating light source is identical with the time variable function of said optical filter the two time variable functions are correlated and impressed upon said film.

2. A real time signal correlator for use on high resolution mapping radar apparatus aboard a moving aircraft having a ground speed indicator and comprising on an optical axis in the order named: A time modulating light source, a first cylindrical lens, an optical filter having at least one optically apertured time variable function and located to be substantially at the imaging plane of said first cylindrical lens, a second cylindrical lens rotated on the optical axis to be normal to said first cylindrical lens, a third cylindrical lens optically parallel to said first cylindrical lens, and an optically sensitive film substantially at the imaging plane of said third cylindrical lens normal to the optical path and movable in a direction parallel to the time variable function on said optical filter, the linear velocity of said film being synchronized to the ground speed indicator on the aircraft so that when the time function of said modulating light source is identical with the time variable function of said optical filter the two time variable functions are correlated and impressed upon said film.

* * * * *